United States Patent
Sugiyama et al.

(10) Patent No.: US 6,186,535 B1
(45) Date of Patent: Feb. 13, 2001

(54) AIR BAG DEVICES

(75) Inventors: Toshiyuki Sugiyama; Kazuhiro Kaneko; Mikio Ochiai; Kevin Dominic Delaney, all of Shizuoka (JP)

(73) Assignee: Nihon Plast Co., Ltd., Fuji (JP)

( * ) Notice: Under 35 U.S.C. 154(b), the term of this patent shall be extended for 0 days.

(21) Appl. No.: 09/385,356

(22) Filed: Aug. 30, 1999

(30) Foreign Application Priority Data

Aug. 31, 1998 (JP) .................................................. 10-245713

(51) Int. Cl.⁷ .................................................. B60R 21/16
(52) U.S. Cl. ........................................ 280/728.2; 280/731
(58) Field of Search .............................. 280/728.2, 728.3, 280/731, 750

(56) References Cited

U.S. PATENT DOCUMENTS

| | | | |
|---|---|---|---|
| 5,678,851 | * 10/1997 | Saito et al. | 280/728.3 |
| 5,685,560 | * 11/1997 | Sugiyama et al. | 280/731 |
| 5,833,262 | * 11/1998 | Fujita et al. | 280/728.2 |
| 5,992,875 | * 11/1999 | Cundill | 280/728.2 |

FOREIGN PATENT DOCUMENTS

| | | | |
|---|---|---|---|
| 5050892 | * 3/1993 | (JP) | 280/782.3 |
| 6-144139 | 5/1994 | (JP) . | |
| 6-298031 | 10/1994 | (JP) . | |

* cited by examiner

*Primary Examiner*—Lanna Mai
*Assistant Examiner*—Lynda Jasmin
(74) *Attorney, Agent, or Firm*—Foley & Lardner

(57) ABSTRACT

An air bag device includes an air bag, a cover concealing the air bag and including a side wall formed with a groove, and a base plate supporting the air bag and including a peripheral wall that faces the inner periphery of the side wall of the cover and is formed with a slit corresponding to the groove of the cover. A belt is disposed along the outer periphery of the side wall of the cover, and includes a holder cooperating with the peripheral wall of the base plate to hold the side wall of the cover. The belt further includes engagements that are engaged with the groove of the side wall of the cover and the slit of the peripheral wall of the base plate and include each an engaging portion engaged with the inner periphery the peripheral wall of the base plate.

15 Claims, 7 Drawing Sheets

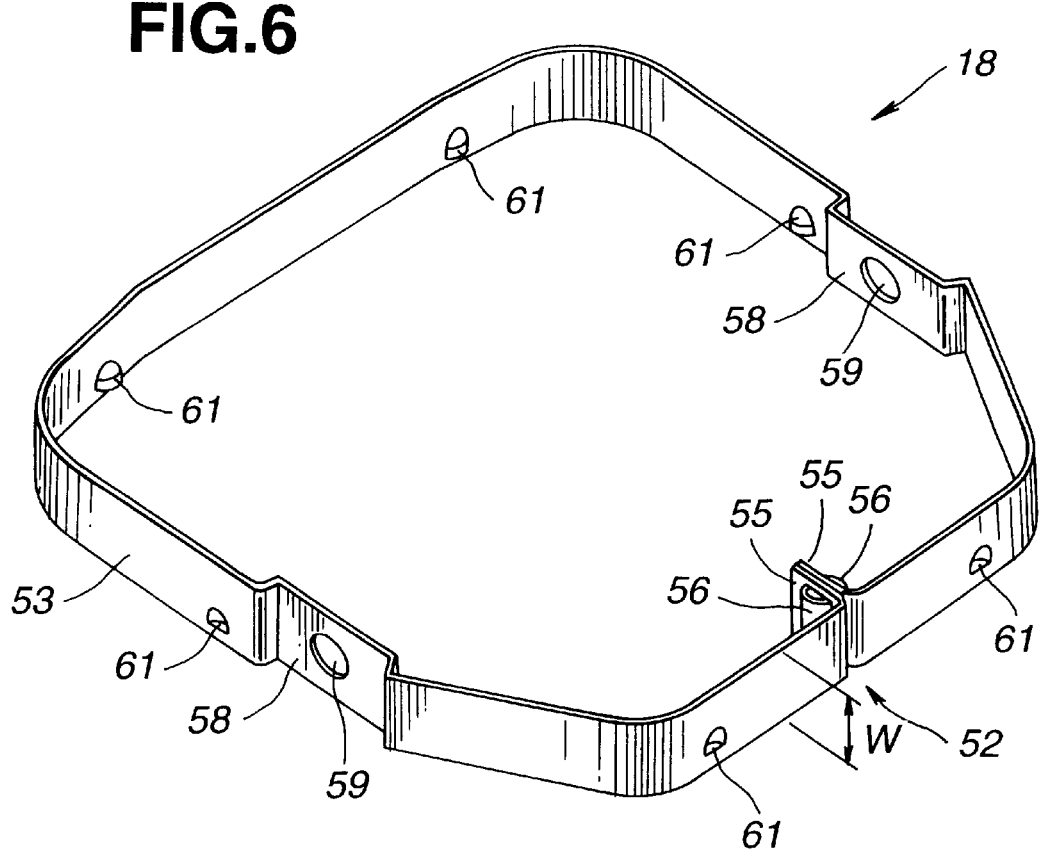
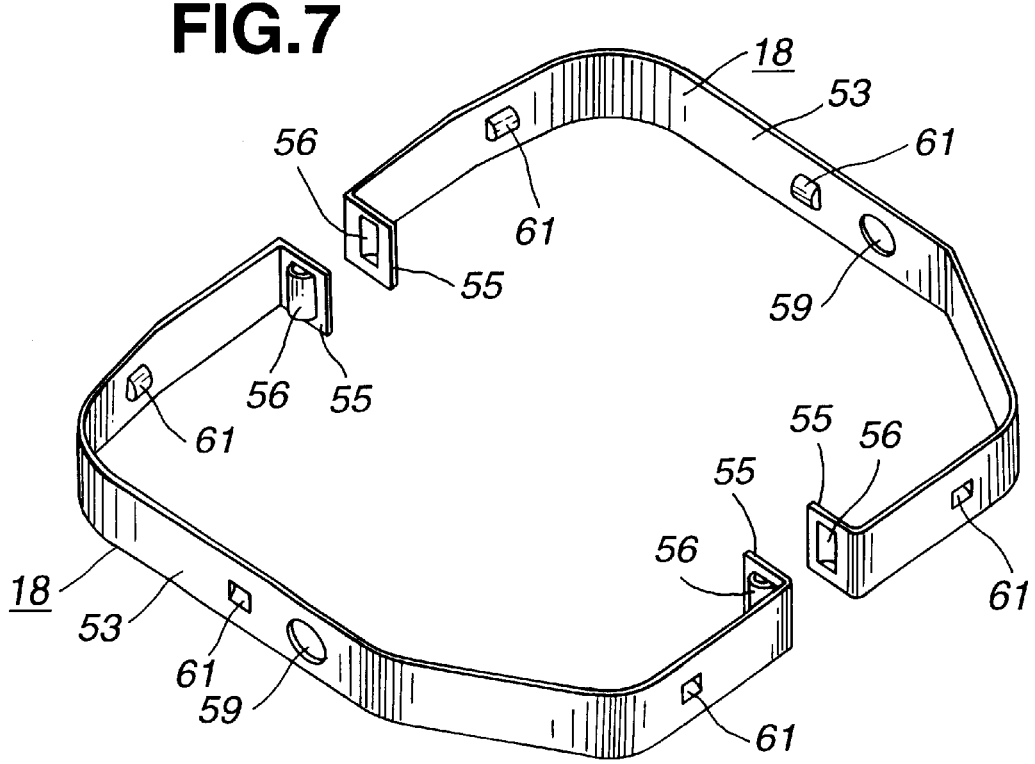

AIR BAG DEVICES

BACKGROUND OF THE INVENTION

The present invention relates to air bag devices having an air bag and a cover disposed thereon.

Air bag devices are known conventionally, which are arranged, for example, at a boss of a steering wheel of a motor vehicle to absorb impact on a driver upon collision. The air bag device comprises an inflator for jetting out gas, an air bag arranged in fold, a cover disposed on the air bag, and a base plate having the inflator, the air bag, and the cover mounted thereon. The air bag device is constructed such that when detecting collision of the motor vehicle, i.e. its sudden deceleration over a predetermined value, the inflator jets out gas instantaneously to distend the air bag. Its pressure serves to break the cover along a predetermined tear line for door-like extension, from which the air bag protrudes to develop in front of the driver.

The cover includes a covering portion for covering the folded air bag and a mounting portion that protrudes downwardly from the covering portion, having substantially a box-like form with an opening on the lower side. Likewise, the base plate includes a base portion having the inflator and the air bag mounted thereon and a support portion that protrudes downwardly from the base portion, having substantially a box-like form with an opening on the lower side. With the mounting portion engaged with the outer periphery of the support portion, the mounting portion, the support portion, etc. are fixed to each other by a number of rivets, obtaining the cover fixed to the base plate.

However, the structure using a number of rivets for fixing the cover is difficult to reduce a manufacturing cost due to the increased number of component parts and complicated assembling process.

JP-A 6-298031 proposes another structure for fixing the cover, wherein the mounting portion of the cover and the support portion of the base plate are formed cylindrically. With the mounting portion engaged with the outer periphery of the support portion, a fastening band is tightly wound on the outer periphery of the mounting portion, obtaining the mounting portion held between the support portion and the band.

However, the structure using the fastening band is difficult to control the fastening strength due to the need of applying an appropriate fastening force for assembling the cover to the base plate. Further, due to the fact that no means are provided to position the fastening band, sure fixing of the cover needs to fasten the band in holding it in an accurate position, resulting in complicated fastening work. Furthermore, the use of the fastening band is not available except the cover and the base plate having a rounded section such as a circle, resulting in limited form of the cover and the base plate.

JP-A 6-144139 proposes still another structure for fixing the cover, wherein with a pair of substantially C-shaped plates disposed on the outer periphery of the mounting portion of the cover engaged with the support portion of the base plate, the support portion, the mounting portion, and the plates are integrally mounted by a number of rivets. Each plate is formed with claws at the lower end, which are engaged with the support portion of the base plate and the mounting portion of the cover for positioning.

However, the structure using the claws has a problem that the claws, arranged for positioning, cannot support the mounting portion against the distending pressure of the air bag, requiring a number of rivets for fixing the air bag, resulting in a difficult reduction in a manufacturing cost due to the increased number of component parts and complicated assembling process.

As described above, the structure using the fastening band needs not only to apply an appropriate fastening force for assembling the cover to the base plate, but to fasten the band in holding it in an accurate position, resulting in complicated fastening work and limited form of the cover and the base plate. On the other hand, the structure using the claws has a problem that the claws, arranged for positioning, cannot support the mounting portion against the distending pressure of the air bag, requiring a number of rivets for fixing the air bag, resulting in a difficult reduction in a manufacturing cost due to the increased number of component parts and complicated assembling process.

It is, therefore, an object of the present invention to provide air bag devices that enable easy and secure fixing of the cover to the base plate.

SUMMARY OF THE INVENTION

One aspect of the present invention lies in providing an air bag device, comprising:

an air bag distended by inflow of gas;

a cover concealing said air bag, said cover including a substantially cylindrical mounting portion, said mounting portion being formed with a groove;

a support member supporting said air bag, said support member including a support portion facing an inner periphery of said mounting portion of said cover, said support portion being formed with a slit corresponding to said groove of said cover; and a holding member disposed along an outer periphery of said mounting portion of said cover, said holding member including a holder cooperating with said support portion of said support member to hold said mounting portion of said cover, said holding member including a plurality of engagements engaged with said groove of said mounting portion of said cover and said slit of said support portion of said support member, each engagement including an engaging portion engaged with an inner periphery of said support portion of said support member.

Another aspect of the present invention lies in providing an air bag device, comprising:

an air bag distended by inflow of gas;

a cover concealing said air bag, said cover including a substantially cylindrical mounting portion, said mounting portion being formed with a groove;

means for supporting said air bag, said supporting means including a support portion facing an inner periphery of said mounting portion of said cover, said support portion being formed with a slit corresponding to said groove of said cover; and means for holding said cover, said holding means being disposed along an outer periphery of said mounting portion of said cover, said holding means including a holder cooperating with said support portion of said supporting means to hold said mounting portion of said cover, said holding means including a plurality of engagements engaged with said groove of said mounting portion of said cover and said slit of said support portion of said support member, each engagement including an engaging portion engaged with an inner periphery of said support portion of said support member.

BRIEF DESCRIPTION OF THE DRAWINGS

FIG. 6 is a perspective view showing the holding member;

FIG. 7 is a view similar to FIG. 6, showing a variant of the holding member;

DETAILED DESCRIPTION OF THE INVENTION

Figure 4:
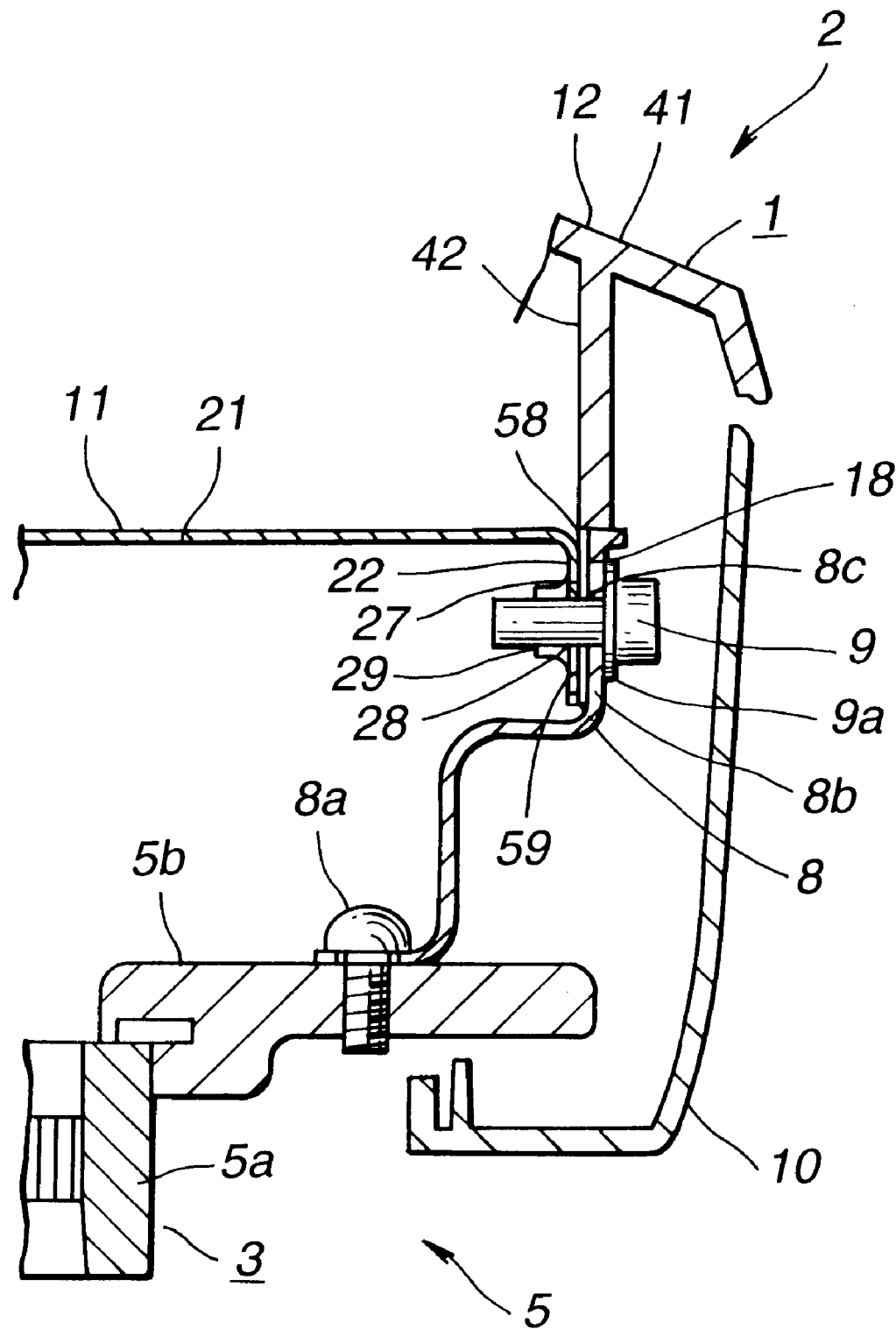
FIG. 4 is a view similar to FIG. 3, taken along the line IV—IV in FIG. 2.

Referring to the drawings, a description will be made with regard to an air bag device embodying the present invention. Referring to FIG. 4, an air bag device or module 1 is mounted to a steering wheel 2 of a motor vehicle. The steering wheel 2 includes a main body 3 and the air bag device 1 mounted thereto on the driver's side or the front side. The steering wheel 2 is mounted to a steering shaft, not shown, with an adjustable inclination, and is generally used in the inclined state. In connection with the steering wheel 2, refer to the driver's side having the air bag device 1 mounted as the upper or front side, to the vehicular body side as the lower or rear side, to the front glass side or the upper front side of the motor vehicle as the forward side, and the driver's side or the lower rear side of the motor vehicle as the rearward side. The steering-wheel main body 3 includes an annular rim, not shown, a boss 5 disposed inside the rim, and a plurality of, e.g. four, spokes for connecting the rim and the boss 5. The boss 5 includes a boss member 5a engaged with the steering shaft and a boss plate 5b separately or integrally fixed thereto. A pair of mounting brackets of air-bag-device mounting members 8 is fixed to the lower portion of the boss plate 5b by screws 8a through a horn switch unit if necessary. The air bag device 1 is mounted to the mounting brackets 8 by cap bolts 9. The lower side portion of the boss 5 is covered with a lower cover 10.

Figure 1:
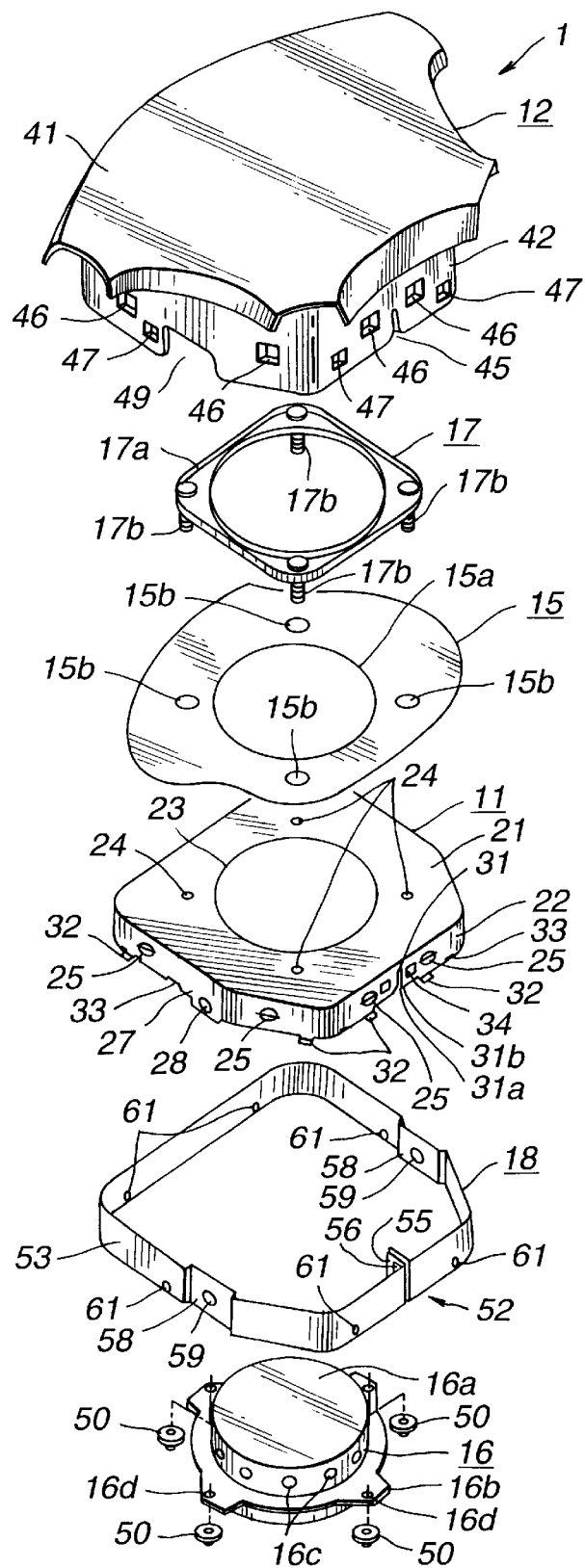
FIG. 1 is an exploded perspective view showing an embodiment of an air bag device according to the present invention.

Referring to FIG. 1, the air bag device 1 comprises a base plate or support member 11, a cover mounted to the base plate 11, an air bag 15, an inflator 16, a retainer 17, and a belt or holding member 18.

Figure 5A:
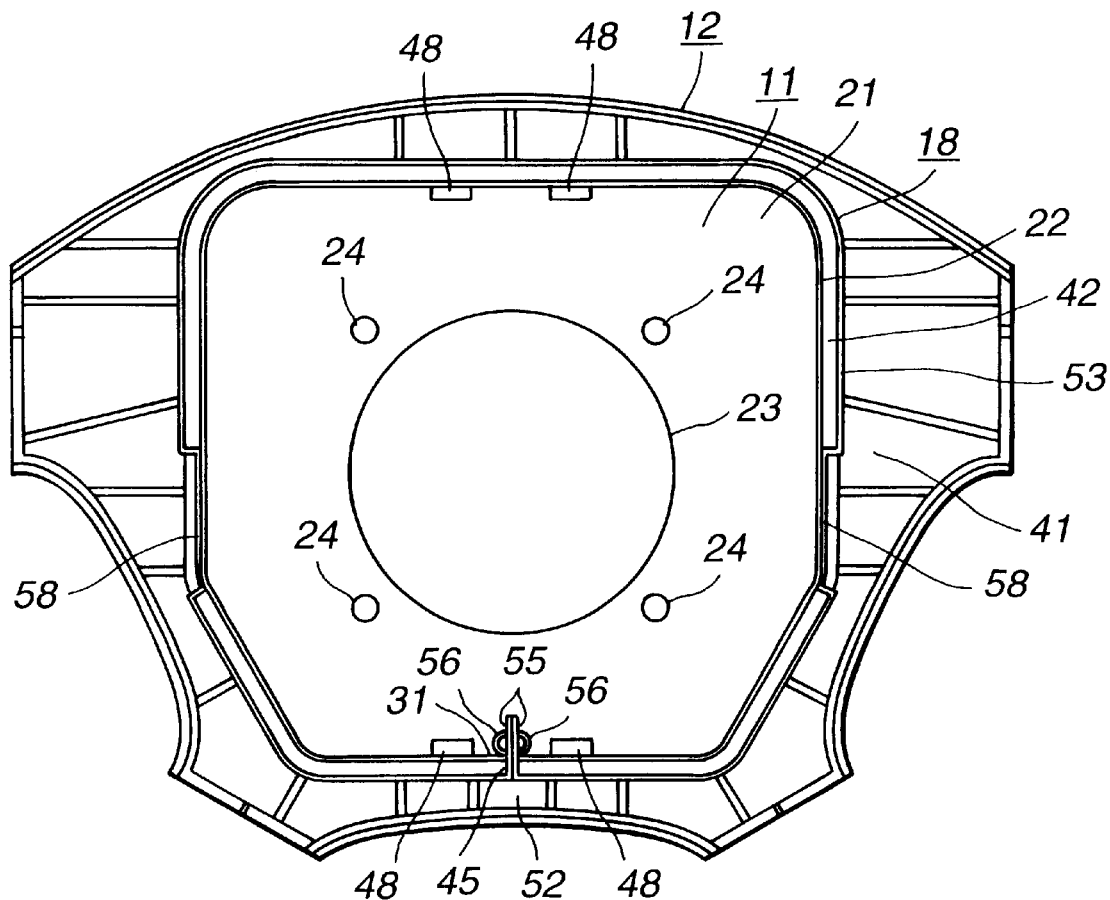
FIG. 5A is a bottom view showing a cover held between a base plate and a holding member or belt.

Referring also to FIG. 5A, the base plate 11 is substantially symmetrically shaped by press working of a metal plate. The base plate 11 includes a substantially hexagonal flat base portion 21 and a peripheral wall or support portion 22 obtained by bending downwardly the outer periphery of the base portion 21, having substantially a box-like form with an opening on the lower side. The base portion 21 has a circular inflator hole 23 substantially in the center, and bolt holes 24 around the inflator hole 23. The peripheral wall 22 is of a polygonal cylindrical shape, and has inner engagements 25 formed outwardly or radially from the peripheral surface or protruding therefrom through cutting or the like. Moreover, as best seen in FIG. 4, the peripheral wall 22 is formed with brackets 27 on both sides of the base plate 11. Each bracket 27 has a bolt hole 28, inside of which a square nut 29 engaged with the cap bolt 9 through caulking or the like is fixedly arranged.

Moreover, as shown in FIG. 1, the peripheral wall 22 is formed with an engaging slit 31 in the center of the rear side of the base plate 11. The engaging slit 31 has a lower end or open end 31a with an opening at the edge and an upper end extending to the position to contact the base portion 21, i.e. it extends over the total width of the peripheral wall 22. Curved or R-shaped guides 31b are formed in the vicinity of the open end 31a of the engaging slit 31 to enlarge downwardly.

Stoppers 32 are formed outwardly protrusively at the lower end of the peripheral wall 22 at predetermined circumferential intervals. Moreover, recesses 33 are formed at the lower end of the peripheral wall 22 at predetermined positions. Moreover, referring also to FIG. 3, rectangular holes 34 are formed in the peripheral wall 22 in the front and rear positions of the base plate 11.

Figure 2:
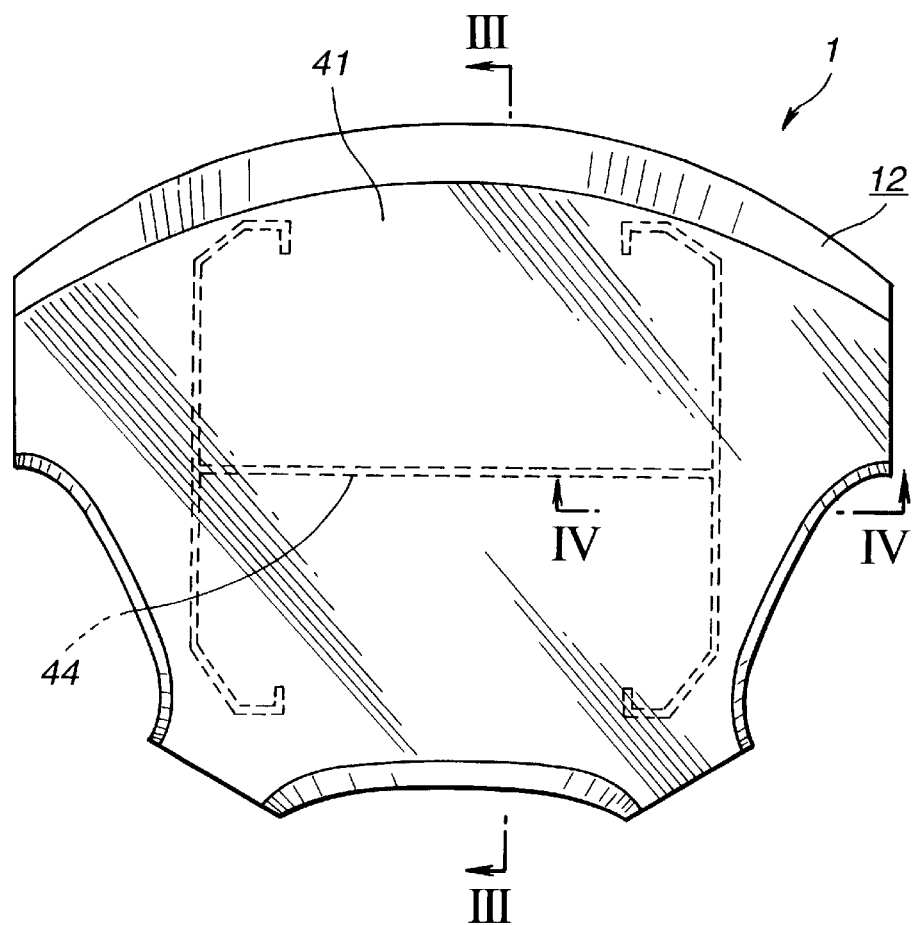
FIG. 2 is a plan view showing the air bag device.
Figure 3:
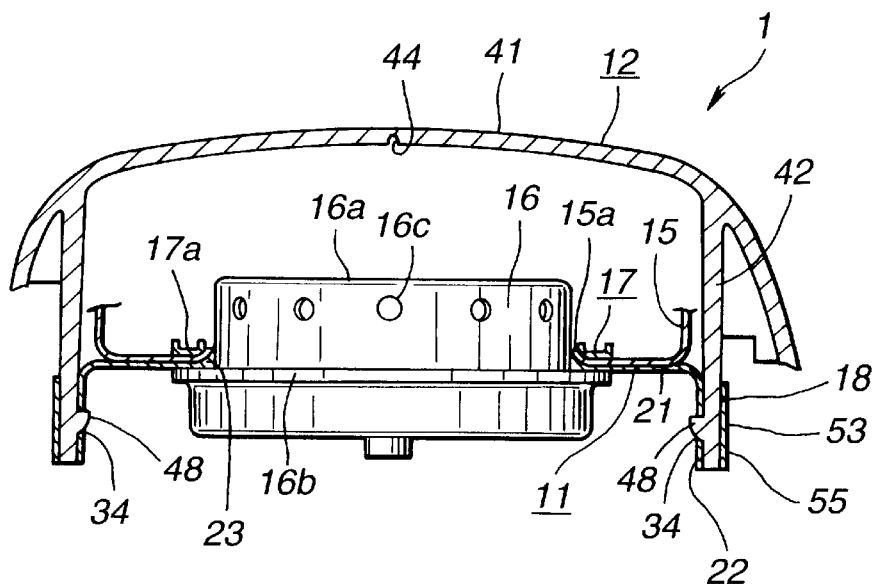
FIG. 3 is a sectional view taken along the line III—III in FIG. 2.
Figure 5B:
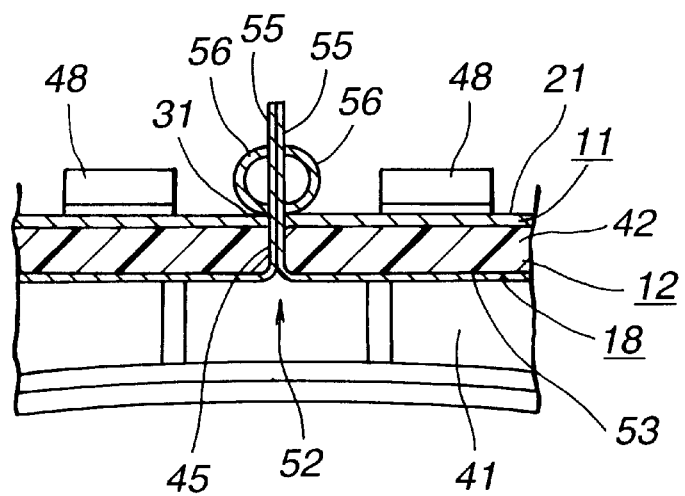
FIG. 5B is an enlarged fragmentary sectional view showing the cover held between the base plate and the holding member.

On the other hand, the cover 12 is integrally formed out of synthetic resins. Specifically, the cover 12 is obtained by injection molding of thermoplastic elastomers such as olefinic elastomer including thermoplastic olefin manufactured by SUMITOMO CHEMICAL CO., LTD. The cover 12 has an external form of a center pad mounted to the steering-wheel main body 3 with four spokes. Specifically, as best seen in FIGS. 2–3, the cover 12 includes a covering portion 41 for covering the boss 5 of the steering-wheel main body 3 and part of the surface of the spokes and a side wall or mounting portion 42 that protrudes downwardly perpendicularly from the lower side of the covering portion 41. The covering portion 41 and the side wall 42 cooperate to each other to define an air bag compartment or receiver for housing the air bag 15. A substantially H-shaped weak tear line 44 is concavely formed in the lower side of the covering portion 41 to face the air bag compartment. The side wall 42 of the cover 12 is of a polygonal cylindrical shape, and has an internal form that substantially corresponds to the external form of the base portion 21 of the base plate 11 for engagement. As best seen in FIGS. 5A–5B, a groove 45 is formed in the side wall 42 in the center of the rear side of the cover 12 to extend upwardly from the edge of the lower end. As shown in FIG. 1, the side wall 42 is formed with rectangular inner engaging holes or first holes 46 as engaging receivers and rectangular outer engaging holes or second holes 47 as engaging receivers, the holes 46, 47 being arranged radially through the side wall 42. Moreover, as best seen in FIGS. 1 and 5A–5B, the side wall 42 is formed with protrusions 48 arranged inside and recesses 49 arranged on and through both sides of the cover 12 and having downward openings.

As shown in FIG. 1, the air bag 15 is formed, for example, like a flat bag obtained by sewing two pieces of cloth. The air bag 15 has a circular gas inlet 15a in the center of the bottom, through which the inflator 16 is arranged, and bolt holes 15b around the gas inlet 15a.

The inflator 16 includes a substantially cylindrical main body 16a and mounting flanges 16b on the outer periphery thereof. Moreover, the inflator 16 has gas jets 16c formed above the mounting flanges 16b to jet out gas into the main body 16a. The mounting flange 16b is formed with bolt holes 16d. A lead wire is drawn from the lower side of the main body 16a. An inflator cover made of synthetic resins may be attached to the main body 16a if necessary.

The retainer 17 includes a substantially annular main body 17a formed with upward flanges on the inner and outer peripheries and having a substantially C-shaped section.

Four stud bolts 17b are fixed downwardly to the main body 17a, with which nuts 50 are engaged from the lower end, respectively.

Referring to FIG. 6, the belt 18 is of a substantially annular shape with a discontinuity 52. Specifically, the belt 18 is obtained by carrying out press working or bending of a steel plate with a substantially fixed width to face both ends without joining. The belt 18 is formed with a holder 53 curved in advance along the outer peripheral surface of the side wall 42 of the cover 12 and engagements 55 obtained by bending both ends with the same width W as that of the holder 53, i.e. the total width of the steel plate, inwardly by 90- to form substantially an L-shape. Engaging portions 56 are circumferentially distantly formed on the engagements 55 to protrude therefrom substantially semi-cylindrically.

Engagements 58 are formed on both sides of the holder 53 to engage with the recesses 49 of the cover 12, each engagement 58 being dented by the thickness of a mounting portion 8b of the mounting bracket 8. A circular mounting hole 59 is formed in each engagement 58. The holder 53 has outer engagements 61 formed circumferentially through cutting or the like to protrude inwardly.

As shown in FIG. 4, a circular mounting hole 8c is formed in the mounting portion 8b of the mounting bracket 8 to correspond to the mounting hole 59 of the engagement 58.

Next, a description will be made with regard to manufacturing processes of the air bag device 1.

The base plate 11, the cover 12, the belt 18, etc. are formed in predetermined shapes in advance.

Deforming ovally the gas inlet 15a of the air bag 15, the retainer 17 is inserted to the inside of the air bag 15 through the gas inlet 15a. The stud bolts 17b are drawn outside from the bolt holes 15b, and are inserted into the bolt holes 24 of the base plate 11 from the upper side to press the circumference of the gas inlet 15a on the base portion 21 of the base plate 11.

In that state, automatic assembling is started with an automatic assembling machine driven by the air pressure or the like. Specifically, with an air bag folder, the air bag 15 is folded in petals around the main body 16a of the inflator 16 to be housed in the external form of the base portion 21 of the base plate 11.

Then, the cover 12 is automatically provided from above the base plate 11 on which the air bag 15 is arranged in fold. With a pneumatic press or the like, the cover 12 is pushed in the base plate 11 to house the air bag 15 between the base plate 11 and the cover 12. The side wall 42 of the cover 12 is engaged with the outer periphery of the base portion 21 of the base plate 11. The inner engagements 25 of the base plate 11 are engaged with the inner engaging holes 46 of the cover 12, respectively, and the lower end of the side wall 42 abuts on the stoppers 32 to restrict the engaging amount. Moreover, the protrusions 48 arranged inside the side wall 42 are engaged with the holes 34 to position accurately the cover 12 to the base plate 11 for anti-loose holding.

Subsequently, the belt 18 is automatically provided to a predetermined position. With the engagements 55 closely contacted each other by clamp means, the holder 53 is press fitted on the outer periphery of the side wall 42 of the cover 12 by a pneumatic press or the like. At that time, the engagements 55 are inserted not only into the groove 45 of the cover 12 from the lower end, but into the engaging slit 31 of the base plate 11 from the open end 31a. Thus, the engaging portions 56 are engaged with the inner surface of the peripheral wall 22. Moreover, the engagements 55 comes in slide contact with the guides 31b of the engaging slit 31, respectively, to reduce or tighten the belt 18 to a predetermined longitudinal dimension. Thus, the side wall 42 of the cover 12, compressed and resiliently deformed, is held between the peripheral wall 22 of the base plate 11 and the belt 18.

At the same time, the engagements 58 of the holder 53 are engaged with the recesses 49 of the cover 12, respectively, for positioning.

When pushing the belt 18 in the cover 12, the outer engagements 61 of the belt 18 abut on the lower end of the side wall 42 of the cover 12 to press it to the inner periphery side. Since the recesses 33 are formed in the base plate 11 to correspond to the outer engagements 61, the side wall 42 resiliently deformed to the inner periphery side is smoothly received in the recesses 33. When pushing the belt 18 further, the outer engagements 61 are inserted in the outer engaging holes 47, and the side wall 42 is resiliently deformed again to engage with the belt 18, which is thus positioned accurately for anti-loose holding.

The side wall 42 of the cover 12 is held between the peripheral wall 22 of the base plate 11 and the belt 18. And the belt 18 ensures engagement of the inner engagements 25 with the inner engaging holes 46, whereas the base plate 11 ensures engagement of the outer engagements 61 with the outer engaging holes 47. Thus, the cover 12 is securely fixed to the base plate 11.

Subsequently, the upper portion of the inflator main body 16a is inserted in the inflator hole 23 and the gas inlet 15a from the lower side of the base plate 11. The stud bolts 17b of the retainer 17 are inserted in the bolt holes 16d of the mounting flange 16b, with which the nuts 50 are engaged from the lower end for tightening. Thus, the base plate 11 and the air bag 15 are both held between the retainer main body 17a and the mounting flange 16b, completing assembling of the air bag device 1.

Then, the air bag device 1 as assembled is mounted to the mounting brackets 8 extending from the boss 5 of the steering-wheel main body 3. At that time, the mounting portion 8b of the mounting bracket 8 is engaged with the engagement 58 of the belt 18. From the outside of the mounting portion 8b, the cap bolt 9 is arranged through the mounting hole 8c of the mounting portion 8b and the mounting hole 59 of the belt 18 through a washer 9a. And the cap bolt 9 is engaged with the square nut 29 through the bolt hole 28 of the bracket 27 of the base plate 11. Thus, the belt 18 with the inner peripheral surface closely contacting the outer peripheral surface of the side wall 42 is further pressed to the base plate 11 by the cap bolt 9.

If the motor vehicle undergoes impact of collision, etc., a control unit, not shown, actuates the inflator 16 to supply instantaneously inert gas such as nitrogen gas from the gas jets 16c to the inside of the air bag 15. This distends the air bag 15 promptly, the pressure of which breaks the covering portion 41 of the cover 12 along the tear line 44 to protrude the air bag 15 upwardly of the cover 12. Moreover, the air bag 15 is widely developed in front of the driver to absorb and alleviate impact thereon.

In this embodiment, the side wall 42 of the cover 12 is held between the peripheral wall 22 of the metallic base plate 11 and the metallic belt 18. And the belt 18 ensures engagement of the inner engagements 25 with the inner engaging holes 46, whereas the base plate 11 ensures engagement of the outer engagements 61 with the outer engaging holes 47. Thus, the cover 12 can securely be fixed to the base plate 11.

The belt 18 is of an engagement form having the engagements 55 at both ends, on which the engaging portions 56 are formed. Holding of the side wall 42 of the cover 12 is carried out as follows. As soon as the belt 18 is engaged with the outer periphery of the side wall 42 of the cover 12, the engagements 55 are inserted in the engaging slit 31 of the base plate 11 from the open end 31a so that the engaging portions 56 are engaged with the inner surface of the peripheral wall 22 in an anti-loose way. Such only one process enables secure holding of the side wall 42 of the cover 12, resulting in easy assembling. Moreover, the belt 18 can be formed only by bending a piece of steel plate with substantially fixed width, resulting not only in the effective use of the steel plate as a material, but a reduction in a manufacturing cost due to its simple form requiring no welding process.

Though with simple structures, the engagements 55 are formed using the total width of the belt 18, and the engaging portions 56 are not formed by bending wherein a bent portion is apt to extend, but by embossing wherein a raised or expanded area is created from a surface, resulting in secure holding of the cover 12 against the pressure of development of the air bag 15. Moreover, since the engaging slit 31 extends from the lower end of the peripheral wall 22 of the base plate 11 to the vicinity of the base portion 21, the engagements 55 inserted in the engaging slit 31 are disposed in the vicinity of the base portion 21. Thus, even if the pressure of development of the air bag 15 operates to bend the peripheral wall 22, the engaging portions 56 of the engagements 55 are supported by the base portion 21, enabling secure holding of the cover 12.

The guides 31b are formed at the engaging slits 31, which come in slide contact with the engagements 55 inserted from the open end 31a to apply longitudinally a force to the belt 18 for tightening, i.e. for compression of the cover 12, resulting in easy insertion of the engagements 55 in the engaging slit 31. Moreover, only one process of press fitting the engagements 55 into the engaging slit 31 enables application of a longitudinal force to the belt 18 for an appropriate amount of tightening, resulting in secure holding of the cover 12.

Since the air bag 15 can be held securely, there is no need of separate fixing members such as a rivet, enabling a reduction in the number of component parts and manufacturing processes of the air bag device 1, facilitating auto-assembling thereof, resulting in a reduction in a manufacturing cost.

In this embodiment, the engaging slit 31 and the groove 45 are formed in the rear portions of the base plate 11 and the cover 12, respectively, where their engagements with the engaging portions 56 of the belt 18 are carried out. Alternatively, the engaging slit 31 and the groove 45 may be formed in other positions. Moreover, in the structure wherein the peripheral wall 22 of the base plate 11 is of a substantially polygonal cylindrical shape with substantially flat supports continuously connected at corners, formation of the engaging slit 31 in the center of the support with the largest longitudinal dimension, e.g. the front support as in this embodiment, enables secure holding of the air bag 15. Specifically, when undergoing the pressure upon development of the air bag 15, the holder 53 of the belt 18 is apt to separate from the peripheral wall 22 in the portion with a larger longitudinal dimension. In view of this, the engaging slit 31 is formed in the front peripheral wall 22 with the largest longitudinal dimension. And the engaging portions 56 of the engagements 55 are inserted in the engaging slit 31 to connect the belt 18 and the base plate 11, enabling secure holding of the cover 12.

Moreover, in this embodiment, the unitary belt 18 serves to cover all circumference of the side wall 42 of the cover 12. Alternatively, referring to FIG. 7, two or more belts 18 may be adopted, each having the engagements 55 with the engaging portions 56 at both ends. With two separate belts 18 as shown in FIG. 7, the engagements 55 of each belt 18 serve to connect the belt 18 and the base plate 11, enabling secure holding of the cover 12. Further, this structure contributes not only to a reduction in the longitudinal dimension of the belts 18, but to an achievement of easier storage than that of the annular members, resulting in a reduction in a manufacturing cost. Furthermore, the outer engagements 61 are formed in the center of each belt 18 in the cross direction, which enables formation of the two belts 18 in the same shape. Thus, a small form of bending can be adopted, resulting in a reduction in a manufacturing cost. It is noted that the belts 18 as shown in FIG. 7 have no engagement 58. With the structure having such belts 18, the mounting portion 8b of the mounting bracket 8 with the same thickness as that of the side wall 42 of the cover 12 is held between the belt 18 and the peripheral wall 22 of the base plate 11, or expansions are formed at the peripheral wall 22 to expand to the belt 18.

Figure 8A:
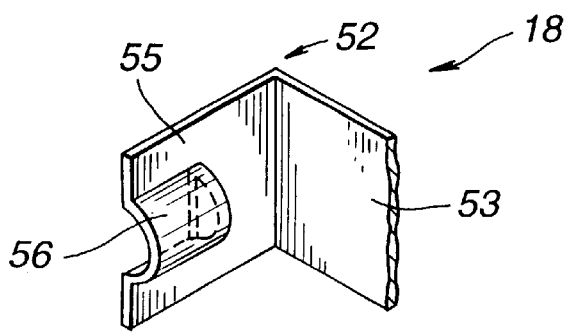
FIGS. 8A–8D are enlarged perspective views, each showing a variant of an engaging portion of an engagement of the holding member.
Figure 8B:
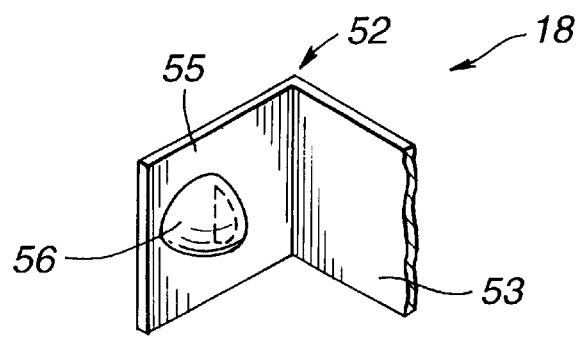
Figure 8C:
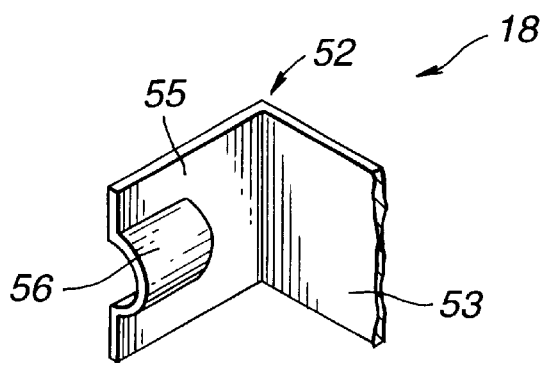
Figure 8D:
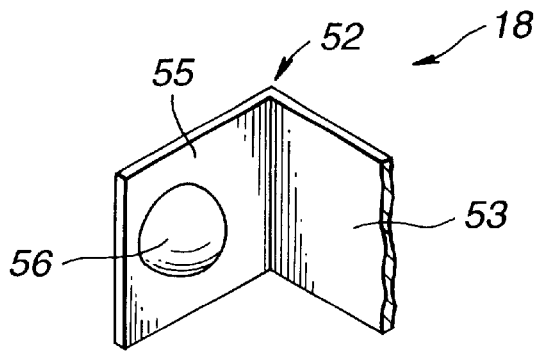

Referring to FIGS. 8A–8D, the engaging portion 56 of the engagement 55 may be formed in different shapes according to different methods, such as a cylinder having an end cut on the side of the discontinuity 52 as shown in FIG. 8A, a semi-sphere having an end cut on the side of the discontinuity 52 as shown in FIG. 8B, a cylinder having an end reduced on the side of the discontinuity 52 as shown in FIG. 8C, and a semi-sphere having an end reduced on the side of the discontinuity 52 as shown in FIG. 8D. In such a way, anti-loose form is achieved at an end of the engaging portion 56 on the side of the discontinuity 52, which abuts on the peripheral wall 22 of the base plate 11, enabling secure holding of the cover 12. Furthermore, the engaging portion 56 may be obtained by fixing a separate member such as a steel block to the engagement 55 by spot welding. Still further, two vertically parallel slits may be formed in the engagement 55 to have therebetween a portion pushed up and expanded in the direction of thickness, which enables increased dimensional accuracy.

Figure 9A:
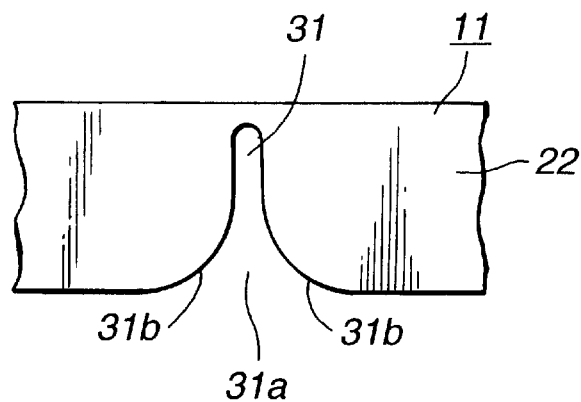
FIGS. 9A–9C are enlarged front views, each showing a variant of an engaging slit of the support member.
Figure 9B:
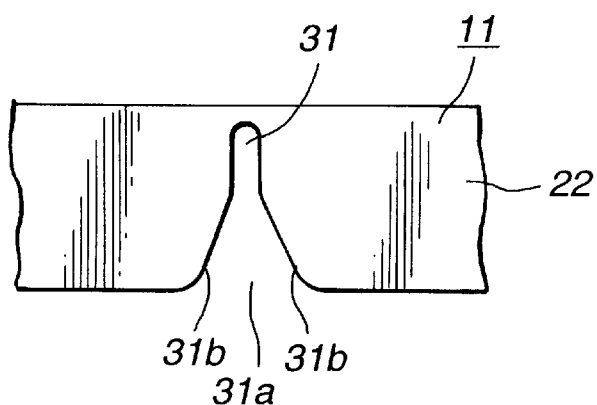
Figure 9C:
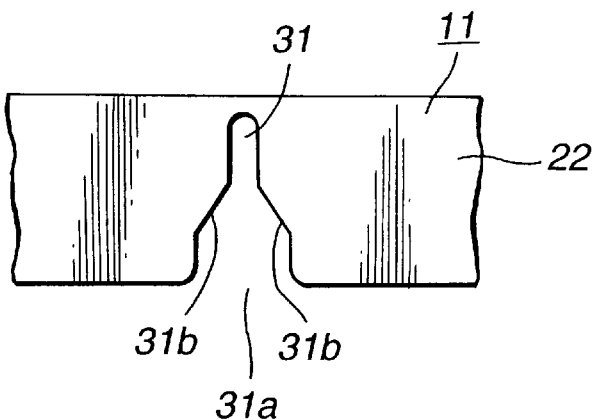

Further, referring to FIGS. 9A–9C, the engaging slit 31 of the peripheral wall 22 of the base plate 11 may be formed in different shapes such as the slit 31 with curved guides 31b at the open end 31a as shown in FIG. 9A, the slit 31 with inclined guides 31b at the open end 31a as shown in FIG. 9B, and the slit 31 with straight and inclined guides 31b in the middle position as shown in FIG. 9C.

Finally, it is noted that the present invention can be applied not only to the driver's air bag device mounted to the steering wheel of the motor vehicle, but the passenger's one mounted to an instrument panel arranged in front of a passenger seat and that one mounted to a seat or a door. The present invention is also applicable to movers other than the motor vehicle, which require absorption of impact, etc.

What is claimed is:

1. An air bag device, comprising:
  an air bag distended by inflow of gas;
  a cover concealing said air bag, said cover including a substantially cylindrical mounting portion, said mounting portion being formed with a groove;
  a support member supporting said air bag, said support member including a support portion facing an inner periphery of said mounting portion of said cover, said support portion being formed with a slit corresponding to said groove of said cover; and
  a holding member disposed along an outer periphery of said mounting portion of said cover, said holding member including a holder cooperating with said support portion of said support member to hold said mounting portion of said cover, said holding member including a plurality of engagements engaged with said groove of said mounting portion of said cover and said slit of said support portion of said support member, each engagement including an engaging portion engaged with an inner periphery of said support portion of said support member.

2. An air bag device as claimed in claim 1, wherein said slit is formed with an open end having an opening at an edge of said support portion of said support member and guides that come in slide contact with said plurality of engagements of said holding member inserted from said open end to tighten said holding member to a predetermined longitudinal dimension.

3. An air bag device as claimed in claim 1, wherein each engagement of said holding member is of substantially the same width as that of said holding member.

4. An air bag device as claimed in claim 1, wherein said support member further includes a base portion.

5. An air bag device as claimed in claim 4, wherein said support portion of said support member is obtained by bending a peripheral edge of said base portion.

6. An air bag device as claimed in claim 5, wherein said slit extends from said edge of said support portion of said support member to the vicinity of said base portion of said support member.

7. An air bag device as claimed in claim 5, wherein said support portion of said support member is of a substantially polygonal cylindrical shape with a plurality of supports continuously connected at corners.

8. An air bag device as claimed in claim 7, wherein said slit is formed in one of said plurality of supports with the largest longitudinal dimension.

9. An air bag device as claimed in claim 1, wherein said engaging portion of each engagement of said holding member is integrally expanded from each engagement.

10. An air bag device as claimed in claim 1, wherein said mounting portion of said cover includes a receiver.

11. An air bag device as claimed in claim 10, wherein at least one of said support member and said holding member includes an engagement engaged with said receiver.

12. An air bag device as claimed in claim 1, wherein said holding member covers substantially all circumference of said mounting portion of said cover.

13. An air bag device as claimed in claim 12, wherein said holding member includes a plurality of portions.

14. An air bag device as claimed in claim 1, wherein said plurality of engagements of said holding member are arranged at both ends of said holding member as viewed in a longitudinal direction of said holding member.

15. An air bag device, comprising:

an air bag distended by inflow of gas;

a cover concealing said air bag, said cover including a substantially cylindrical mounting portion, said mounting portion being formed with a groove;

means for supporting said air bag, said supporting means including a support portion facing an inner periphery of said mounting portion of said cover, said support portion being formed with a slit corresponding to said groove of said cover; and means for holding said cover, said holding means being disposed along an outer periphery of said mounting portion of said cover, said holding means including a holder cooperating with said support portion of said supporting means to hold said mounting portion of said cover, said holding means including a plurality of engagements engaged with said groove of said mounting portion of said cover and said slit of said support portion of said support member, each engagement including an engaging portion engaged with an inner periphery of said support portion of said support member.

* * * * *